US009852423B2

United States Patent
Sagady et al.

(10) Patent No.: US 9,852,423 B2
(45) Date of Patent: Dec. 26, 2017

(54) SYSTEMS AND METHODS FOR WIRELESS AUTHORIZATION OF TRANSACTIONS WITH MOBILE PAYMENT DEVICES

(71) Applicant: USA TECHNOLOGIES, INC., Malvern, PA (US)

(72) Inventors: Cary M. Sagady, Chester Springs, PA (US); Joseph A. Simpkins, West Chester, PA (US); Denis Kouznetsov, Pottstown, PA (US)

(73) Assignee: USA Technologies, Inc., Malvern, PA (US)

(*) Notice: Subject to any disclaimer, the term of this patent is extended or adjusted under 35 U.S.C. 154(b) by 730 days.

(21) Appl. No.: 14/499,796

(22) Filed: Sep. 29, 2014

(65) Prior Publication Data
US 2015/0287030 A1    Oct. 8, 2015

Related U.S. Application Data

(60) Provisional application No. 61/976,584, filed on Apr. 8, 2014.

(51) Int. Cl.
*G06Q 20/00* (2012.01)
*G06Q 20/38* (2012.01)
(Continued)

(52) U.S. Cl.
CPC ......... *G06Q 20/3829* (2013.01); *G06Q 20/32* (2013.01); *G06Q 20/3226* (2013.01);
(Continued)

(58) Field of Classification Search
USPC .......... 705/16, 21, 59, 71; 380/44, 262, 278, 380/279
See application file for complete search history.

(56) References Cited

U.S. PATENT DOCUMENTS

2009/0068982 A1    3/2009  Chen et al.
2012/0323717 A1*  12/2012  Kirsch ............... G06Q 20/0855
                                                          705/26.1

FOREIGN PATENT DOCUMENTS

WO    WO 2013/051029    4/2013

OTHER PUBLICATIONS

International Preliminary Report on Patentability and Written Opinion dated Oct. 12, 2016 for International Application No. PCT/US2015/024899, 8 pages.
(Continued)

*Primary Examiner* — Dante Ravetti
(74) *Attorney, Agent, or Firm* — RatnerPrestia

(57) ABSTRACT

Methods for authorizing wireless payment transactions that include encrypting, with an encryption module on the mobile payment device, a payment account token stored on a mobile payment device and a session key generated on the mobile payment device with a public key. The methods also include transmitting the encrypted payment account token and session key to a vending machine, further encrypting, with the vending machine, the encrypted payment account token and session key with a device key, and transmitting, from the vending machine, the encrypted payment account token and session key to a central server. The methods further include decrypting the payment account token and session key with the device key and with a private key stored at the central server and sending an authorization determination and session key from the central server to the vending machine based on the decrypted payment account token and session key.

8 Claims, 4 Drawing Sheets

(51) Int. Cl.
*G06Q 20/32* (2012.01)
*H04L 9/08* (2006.01)
*H04L 9/14* (2006.01)

(52) U.S. Cl.
CPC .............. *H04L 9/0822* (2013.01); *H04L 9/14* (2013.01); *H04L 2209/56* (2013.01); *H04L 2209/80* (2013.01)

(56) References Cited

OTHER PUBLICATIONS

International Search Report and Written Opinion for PCT/US2015/024899 dated Aug. 12, 2015.
Fei Shuai et al., "Research on symmetric key-based mobile payment protocol security," Information Theory and Information Security (ICITIS), 2010 IEEE Intl. Conf. on, Dec. 2010, pp. 340-344. XP031850592.

\* cited by examiner

SYSTEMS AND METHODS FOR WIRELESS AUTHORIZATION OF TRANSACTIONS WITH MOBILE PAYMENT DEVICES

CROSS REFERENCE TO RELATED APPLICATIONS

This application claims priority to U.S. Ser. No. 61/976,584 filed Apr. 8, 22014, titled "SYSTEMS AND METHODS FOR WIRELESS AUTHORIZATION OF TRANSACTIONS WITH MOBILE PAYMENT DEVICES," the contents of such application being incorporated by reference herein.

FIELD OF THE INVENTION

The invention relates to wireless communication in vending systems.

BACKGROUND OF THE INVENTION

Mobile payment devices are utilized for wireless payment transactions. With the abundance of wireless payment transactions being conducted, security of the transactions remains a concern. There is a need for improved authorization processes that provide enhanced security in wireless payment transactions.

SUMMARY OF THE INVENTION

Aspects of the invention include methods for authorizing wireless payment transactions. The methods include encrypting, with an encryption module on a mobile payment device, a payment account token stored on a mobile payment device and a session key generated on the mobile payment device with a public key. The methods also include transmitting the encrypted payment account token and session key to a vending machine, further encrypting, with the vending machine, the encrypted payment account token and session key with a device key, and transmitting, from the vending machine, the encrypted payment account token and session key to the central server. The methods further include decrypting the payment account token and session key with the device key and with a private key stored at the central server and sending an authorization determination and session key from the central server to the vending machine based on the decrypted payment account token and session key.

Further aspects of the invention include systems for authorizing wireless payment transactions. The systems may include a mobile payment device with a public key and an account token stored in a data storage module, as well as a a session key generator and an encryption module configured to encrypt the session key and the account token with the public key. The systems may also include a central server with a private key stored in a key storage module, and an authorization module configured to produce an authorization determination of a wireless transaction from a mobile payment application. The systems may further include a vending machine configured to receive the encrypted session key and account token from the mobile payment device, further encrypt the received encrypted session key and account token with a device key, transmit the further encrypted session key and account token to the central server, receive the authorization determination from the central server, and vend a product based on the authorization determination.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. Included in the drawings are the following figures.

DETAILED DESCRIPTION OF THE INVENTION

Figure 1:
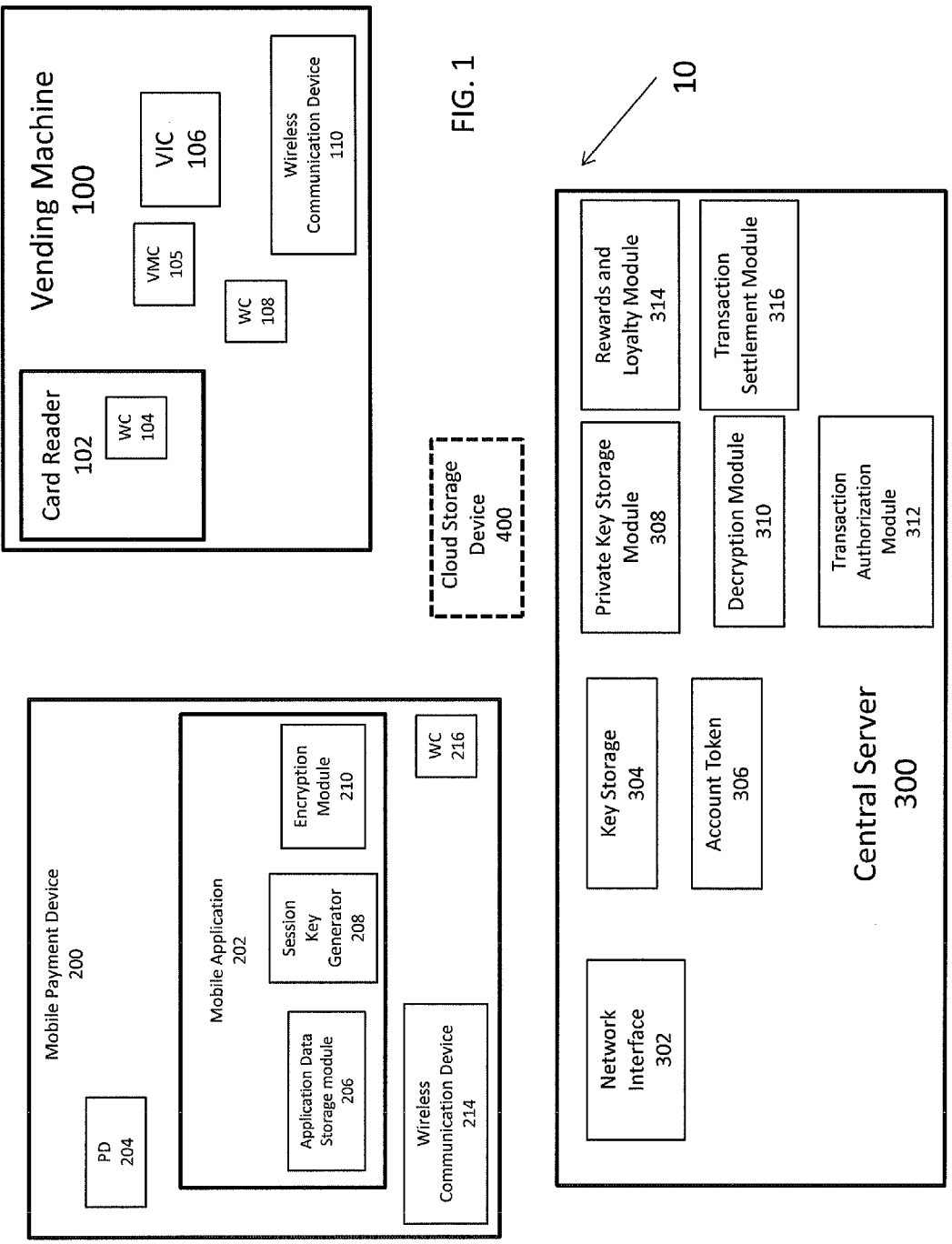
FIG. 1 is a functional block diagram of an authorization system according to aspects of the invention.

Referring to FIG. 1, a functional diagram of a system according to aspects of the invention is shown. The system 10 generally includes a vending machine 100, a mobile payment device 200, a central server 300, and a cloud storage device 400. Although not depicted in FIG. 1, the vending machine 100, the mobile payment device 200, the central server 300, and the cloud storage device 400 are configured to be in communication either directly or indirectly. These components may be in communication via a wired network, Wi-Fi internet, RF communication, near-field communication, Bluetooth communication, cellular communication, local wireless communication or any combination thereof. One of skill in the art will recognize other suitable communication formats for the components of system 10 from the description herein.

The vending machine 100 includes a card reader 102, a local wireless communication device (WC) 104 (e.g., Bluetooth, NFC, Wi-Fi, RF, cellular, local, etc.) coupled to the card reader 102, a vending controller (VIC) 106, a wireless communication device 110 (e.g., cellular), and an optional local wireless communication device (WC) 108 (e.g., Bluetooth, NFC, Wi-Fi, RF, cellular, local, etc.) coupled to the VIC 106 and/or the wireless communication device 110. The card reader 102 may be a credit card reader, debit card reader, gift card reader, and/or other payment card reader suitable for tendering payment to the vending machine 100. The wireless communication device 110 is configured to receive and transmit information wirelessly with the other components of system 10 (e.g., mobile payment device 200, central server 300, cloud storage device 400, etc.). The wireless communication device 110 may be configured to communicate wirelessly via Wi-Fi internet, Bluetooth, NFC, RF, etc. Other suitable wireless communication formats for the wireless communication device 110 will be understood by one of skill in the art from the description herein.

The vending controller 106 enables cashless transactions (e.g., credit/debit card payments). In an embodiment, the vending controller 106 communicates with the vending machine controller (VMC) 105 of the vending machine 100. The vending controller may be a slave to the VMC 105 and may communicate with the VMC over a multi-drop bus (MDB) within the vending machine 100. In one embodiment, the VIC 106 stores a device key used for encrypted secure communication between the vending machine 100 and the central server 300.

The mobile payment device 200 includes a mobile payment application 202, a display 204, a wireless communication device 214, and a local communication device 216 (e.g., Bluetooth). The mobile payment device 200 may essentially be any device capable of running the mobile payment application 202 and processing mobile payments. In one embodiment, the mobile payment device 200 is a cellular telephone. The mobile payment device 200 may also be a tablet computer, a laptop or other computer, a portable electronic device, etc.

The mobile payment device 200 includes a presentation device (PD) 204. The PD 204 may be capable of communicating information to a user of the mobile payment device 200. In one embodiment, the PD 204 is a visual display (e.g., LED display, LCD display, OLED display, touch screen display, etc.) capable of visually displaying text messages, video messages, information, an interface of the mobile application 202, etc. The PD 204 may also be capable of outputting audio messages. In one embodiment, the PD 204 is configured to alert the user of the mobile payment device 200 of information received with visual alerts and/or audio alerts. Conventional displays for mobile payment devices may be used as the PD 204 of the mobile payment device 200.

The mobile payment device 200 also includes a wireless communication device 214 that is configured for wireless communications with components of the system 10. The functionality of the wireless communication device 214 is similar to that of wireless communication device 110 as described above.

The mobile payment device 200 includes a WC 216 configured for wireless communication (e.g., Bluetooth, Wi-Fi, NFC, RF, cellular, local, etc.) with other components of the system 10. In one embodiment, the WC 216 is configured to receive signals from the vending machine 100 via WC 104 and/or WC 108 when the mobile payment device is within the transmission range of the WC 104/WC 108. The WC 216 may also be configured to receive and transmit signals from WC 104, central server 300, and/or cloud storage device 400, as well as the components of the mobile payment device (e.g., mobile application 202, display 204, and/or wireless communication device 214).

The mobile payment device 200 has installed on it a mobile payment application 202. The mobile payment application 202 is an application designed for wireless payment. In one embodiment, the mobile payment application 202 is configured for mobile wireless payment with vending machines, such as vending machine 100.

The mobile payment application 202 includes an application data storage module 206, a session key generator 208, and an encryption module 210. The application data storage module 206 is configured to store data for use in the operation of the mobile payment application 202. In one embodiment, the application data storage module 206 stores a public key and an account token received from the central server. The public key may be used by the mobile payment device 200/mobile payment application 202 for encryption of transaction information on the mobile payment device 200. The account token received from the central server is a token that represents an account of the user associated with the mobile payment application 202. The account token may be used similar to a credit card number for transactions within the mobile payment application 202. In an embodiment, the account token is generated independently from any credit card or bank account number, such that, if hacked, the account token cannot be decrypted to reveal any such credit card number or account of the user outside of the mobile payment application account.

The session key generator 208 is configured to generate a session key for a transaction that is commenced by a user through the mobile payment application 202. In one embodiment, the session key generator may generate a session key that is used for encrypted secure communication between the mobile payment device 200 and the vending machine 100 (e.g., VIC 106).

The encryption module 210 utilizes the public key stored in the application data storage module 206 to encrypt data that is to be transmitted for authorization of a transaction through the mobile payment application 202. The encryption module 210 may be configured to encrypt the account token, transaction information relating to the mobile payment application 202, user credentials (e.g., a user application log-in information), etc.

The system 10 also includes a central server 300. The central server 300 is in wireless communication with the components of the system 10 (e.g., the vending machine 100, mobile payment device 200, cloud storage device 400, etc.). The central server 300 is configured to process information and data relating to the operation of the system 10 and configure settings for the operation of the system 10, as will be described at FIGS. 2 and 3.

The central server 300 includes a network interface 302, a key storage 304, and an account token 306 unique to each mobile payment application user account. The network interface 302 is configured for wireless communications with components of the system 10. The functionality of the network interface 302 may be similar to that of wireless communication device 110 and wireless communication device 214 as described above. The central server 300 also stores a public key and a device key in a key storage 304 on the server 300, as well as an account token 306. In one embodiment, the public key stored in the key storage 304 and account token 306 are downloaded by the mobile payment device 200 and are stored on the application data storage module 206.

The server 300 uses the account token 306 to uniquely identify a consumer account and consumer and keep track of consumer transactions for reward point accumulation and participation in promotional campaigns. For example, the server 300 may incorporate a hash value generator, a card ID generator and a consumer profile generator (not shown). In such embodiments, when the server 300 receives card information (e.g., credit card, debit card, gift card, etc.) for a transaction, it generates a hash value of the card information. The server can then determine whether the hash value has been previously associated with a card ID or a consumer profile from a previous transaction. If the hash value has been associated with a card ID and/or a consumer profile, the server 300 can then look up and update rewards and loyalty information via the rewards and loyalty module 314 as is described below. If the hash value has not been associated with a card ID and/or consumer profile, the server 300 may generate a new card ID (e.g., a sequential integer) and associate the generated card ID with the hash value. The server 300 may also generate a new consumer profile and associate the hash value and/or the card ID with the new consumer profile. The new consumer profile may be used for the rewards and loyalty programs via the rewards and loyalty module 314. Systems and methods for generating and associating hash values, cards IDs and consumer profiles are described in U.S. patent application Ser. No. 14/485, 274 entitled "Unattended Retail Systems, Methods, and Devices for Linking Payments, Loyalty and Rewards," the contents of which are incorporated by reference herein.

The server 300 additionally includes a private key storage module 308, a decryption module 310, and a transaction authorization module 312. In one embodiment, the private key storage module 308 is configured to store a private key that is used to decrypt various data relating to the mobile payment application transactions that are encrypted by the mobile payment device 200 and the vending machine 100. The decryption module 310 is configured to decrypt such data that is encrypted with the public key and/or device key utilizing the private key stored at the private key storage module 308. In one embodiment, once decrypted, the data is sent to the transaction authorization module 312. The authorization module 312 is configured to determine whether to authorize the transaction based on the decrypted data. This determination may be based on available funds associated with the account token, authentication of user credentials, authentication of a transaction identification number, etc. In an embodiment, following the determination, the transaction authorization module 312 is configured to encrypt the authorization determination with the device key prior to transmitting the authorization determination to the vending machine 100.

The server 300 also includes a rewards and loyalty module 314 and a transaction settlement module 316. In embodiments that utilize rewards or loyalty programs as part of the vending machine transaction processing, the rewards and loyalty module 314 and the transaction settlement module are utilized. The rewards and loyalty module 314 is configured to look up the consumer account based on the information decrypted by the decryption module 310 and to determine whether the consumer account has sufficient rewards and/or loyalty points to complete the transaction and/or qualify for a discount on the transaction. If it is determined that the consumer has sufficient loyalty or rewards points, the transaction is then settled by the transaction settlement module 316, which may then send the transaction information back to the rewards and loyalty module 314 to update the loyalty and/or rewards associated with the consumer account.

The system also includes a cloud storage device 400. The cloud storage device 400 may be in communication with any of the components of system 10, and is configured for information storage outside of the central server 300, the mobile payment device 200, and/or the vending machine 100. In one embodiment, the cloud storage device 400 resides on the central server 300. The cloud storage device 400 may be configured to store keys, tokens, credentials, transaction identification numbers, and/or any other data used in conjunction with the system 10.

Figure 2:
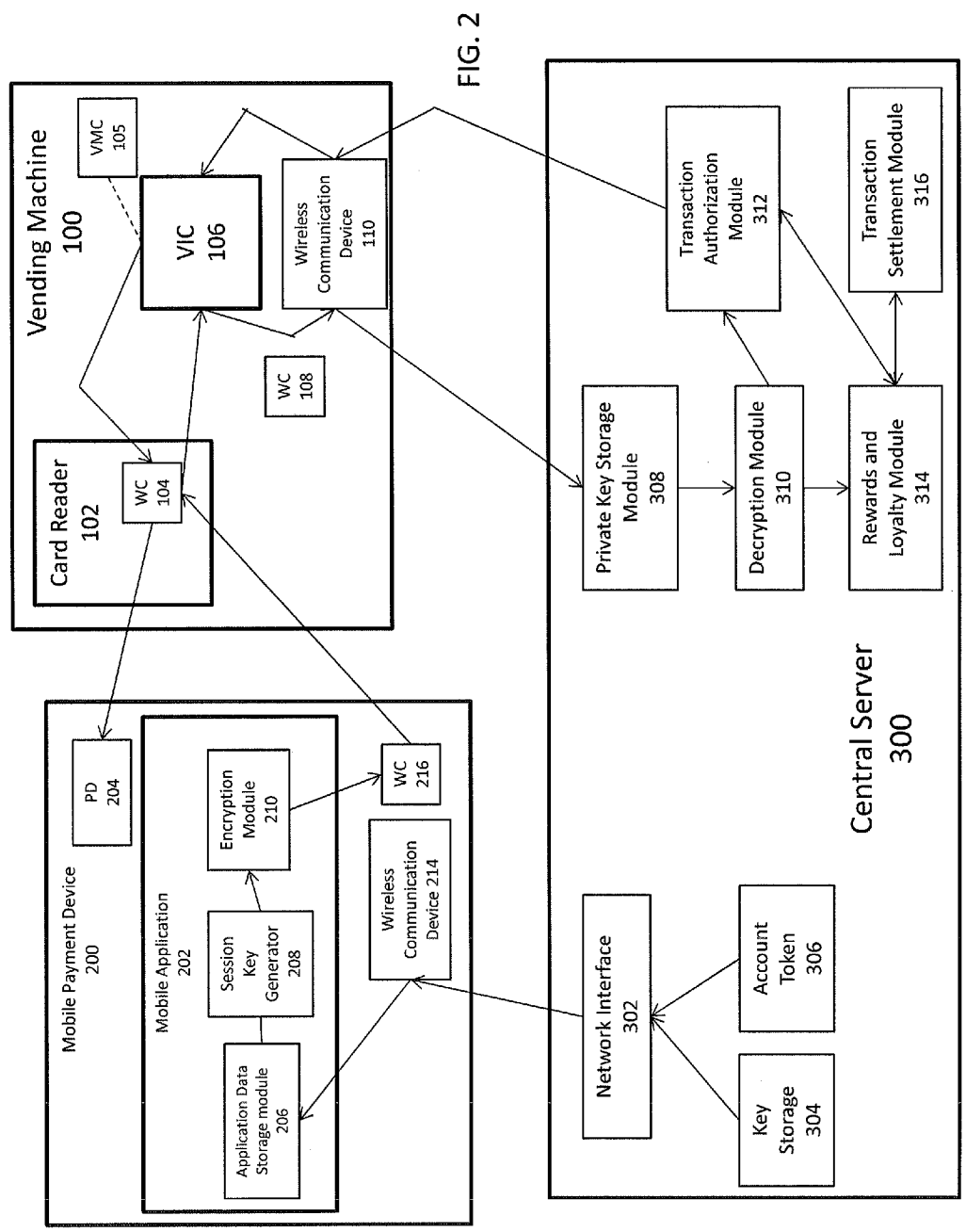
FIG. 2 is a functional block diagram depicting data flow in an authorization system according to aspects of the invention.

Referring next to FIG. 2, a functional diagram depicting data flow within the system is shown according to aspects of the invention. The data flow depicted in FIG. 2 is exemplary, and it will be understood that alternative data flow paths and arrangements may be used to effectuate the invention from the description herein.

Referring to the central server 300, the public key and the account token 306, the account token 306 being unique to the user of the mobile payment application, are transmitted to the application data storage module 206 of the mobile payment device 200 via the network interface 302 and the wireless communication device 214. Once stored, the public key and the account token 306 can be used to complete transactions with the mobile payment application 202.

In one embodiment, to conduct a transaction, the user of the mobile application 202 inputs the user's credentials into the mobile application 202. Following the input of the credentials, the session key generator 208 may then generate a session key for encrypting communications between the mobile payment device 200 and the vending machine 100 for the particular transaction. In one embodiment, the entered credentials, along with the generated session key and the account token 306 are encrypted via the encryption module 210 with the public key stored in the data storage module 306. The credentials, account token 306, and the session key encrypted with the public key may be a mobile payment application data packet.

The encrypted credentials, session key, and account token 306 are then transmitted to the VIC 106 of the vending machine 100. As depicted, the encrypted information may be sent to the VIC 106 via WC 216 to WC 104, and then to the VIC 106. In alternative embodiments, the encrypted information may be sent to the VIC 106 via WC 108, or through either wireless communication devices 214 and 110, and/or any combination of the WCs 104, 108 and the wireless communication devices of system 10.

In an embodiment, the VIC 106 has stored in it the device key and uses the device key 304 for encrypting additional data. The VIC 106, may then generate a transaction identification number, an authorization amount for the transaction, an entry type and/or other authorization request fields used to obtain authorization for the transaction. In one embodiment, the VIC 106 encrypts the additionally generated data with the device key. The additionally encrypted data may be an authorization data packet. The VIC 106, with the additional data encrypted with the device key (e.g., authorization data packet), and the data encrypted with the public key received from the mobile payment device 200 (e.g., the mobile payment application data packet), may transmit all the encrypted data to the central server 300 for authorization.

The central server 300 receives the encrypted data transmitted from the VIC 106. In one embodiment, the data received from the VIC 106 is transmitted to the decryption module 310. The decryption module 310 utilizes the device key to decrypt the encrypted data generated by the VIC 106 (e.g., the authorization data packet) and utilizes the private key stored in the private key storage module 308 to decrypt the session key, account token 306, and the user credentials (e.g., the mobile payment application data packet).

In an embodiment, once the data is decrypted, the decrypted data is sent to the transaction authorization module 312. The authorization module 312 may be configured to determine whether to authorize or decline the transaction based on verifying the decrypted data (e.g., whether the credentials match the account token, etc.) and/or verifying available funds of the user's account based on the authorization amount request generated by the VIC 106. In one embodiment, the authorization module 312 produces an authorization determination and encrypts the authorization determination, the session key and the other data relating to the transaction with the device key. The authorization module 312 may then transmit the encrypted authorization determination, session key, and other data to the VIC 106.

In embodiments utilizing a rewards or loyalty program, the information is sent to the rewards and loyalty module 314 from the decryption module 310. The rewards and loyalty module 314 may be configured to look up the consumer account information from the decrypted information and then determine whether the consumer account has sufficient rewards or loyalty points to complete the transaction or qualify for a discount on the transaction. If the consumer does not have sufficient rewards or loyalty points, the rewards and loyalty module 314 sends the information to the transaction authorization module 312 for standard transaction completion. If the consumer has sufficient loyalty points, the rewards and loyalty module 314 sends the information to the transaction settlement module 316 to settle the transaction. The transaction settlement module 316 may then send the information back to the rewards and loyalty module 314 to update the rewards and loyalty information/points associated with the consumer account.

If a discount campaign is available, the transaction amount is reduced by the discount amount, and the transaction is sent to the transaction settlement module 316 for settlement. After the transaction is settled, transaction information may be sent to rewards and royalty module 314 again which records the rewards points based on the settled amount and increments the number and total amount of processed transactions. The rewards and loyalty module 314 may apply a promotion such as a spend bonus to the consumer account if the amount spent reaches the configured threshold. Also, if the consumer account balance falls under a configured threshold, it may charge a credit or debit card on file automatically for the configured replenishment amount and apply the replenishment amount to the consumer account balance. If a replenishment bonus campaign is available for the consumer account, it may apply the replenishment bonus amount to the consumer account balance.

The VIC 106 receives the encrypted authorization determination, session key, and other data and decrypts it with the device key stored on the VIC 106. The VIC 106 may then post funds to the VMC of the vending machine 100 for vending the product sought to be purchased with the mobile payment application 202 if the transaction is authorized. In one embodiment, the VIC 106, now with the decrypted session key, re-encrypts the authorization determination with the session key and transmits the authorization determination to the mobile payment application 202 of the mobile device 200 via WC 104. The encrypted authorization determination may be transmitted to the mobile payment device 200 via WC 108, wireless communication device 110, and/or wireless communication device 214.

The received authorization determination is decrypted by the mobile payment application 202 with the session key, and the results of the transaction are displayed to the user of the mobile payment application 202 via PD 204. In one embodiment, following a successful transaction, other communications may be performed securely directly between the mobile payment application 202 and the VIC 106 using the session key.

Figure 3:
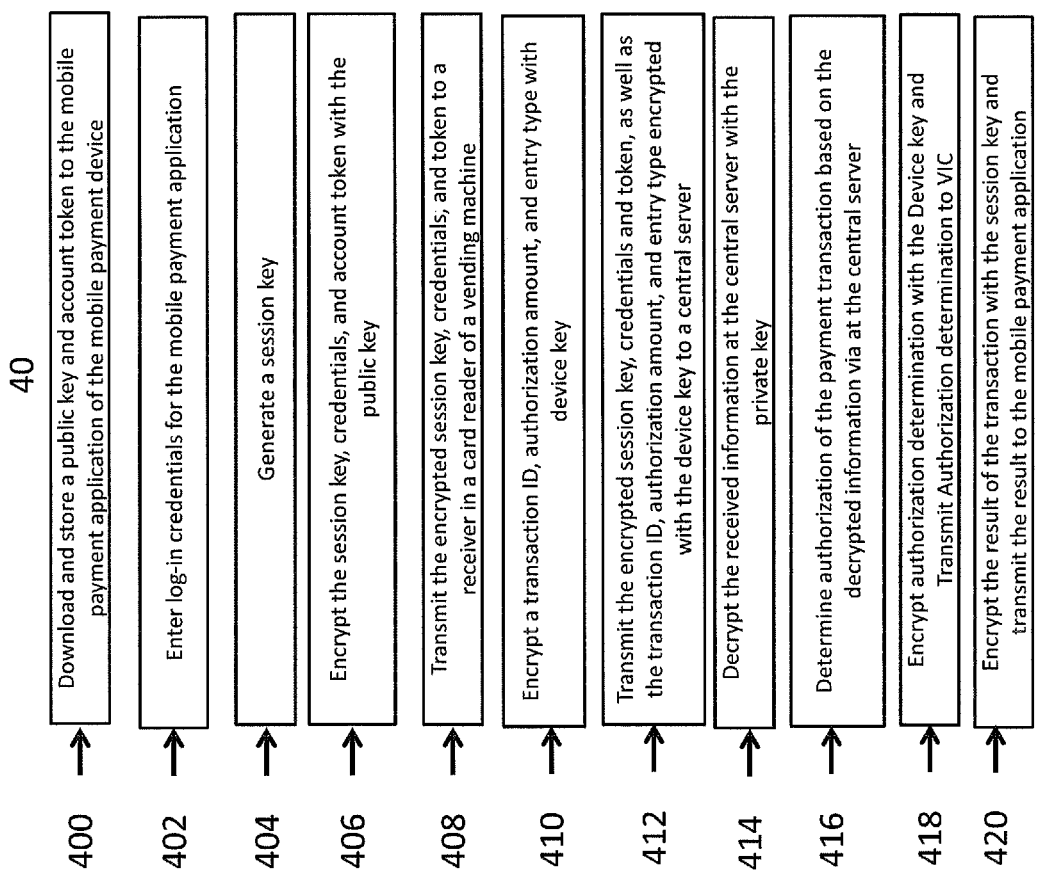
FIG. 3 is a flowchart of steps for authorizing transactions in accordance with aspects of the invention.

FIG. 3 is a flowchart 40 of exemplary steps for authorizing a payment transaction with a wireless mobile payment application. At block 400, a public key and account token are downloaded and stored to the mobile payment application of a mobile payment device. The public key and account token may be downloaded from a central server. In one embodiment, the account token is unique to the user of the mobile payment application.

At block 402, a user of the mobile payment application enters credentials into the mobile application device to use the mobile payment application. In one embodiment, the credentials include a log-in (e.g., a screen name, a user name, etc.) and a password. The credentials may be entered using a presentation device, such as PD 204.

At block 404, a session key is generated with the mobile payment device using the downloaded and stored public key. The session key may be used for secured communication between the mobile payment device and the vending machine.

At block 406, the session key, credentials, and account token are encrypted with the public key. In one embodiment, the session key, credentials, and account token are encrypted via an encryption module that resides on the mobile payment device.

At block 408, the encrypted session key, credentials, and token are transmitted to a receiver in a vending machine. In one embodiment, the receiver is a Bluetooth receiver fitted into a credit card reader of the vending machine. The encrypted session key, credentials, and token may be transmitted via Bluetooth transmitters, cellular transmitters, etc.

At block 410, the vending machine encrypts the session key, credentials, and token with a device key stored on the vending machine. In one embodiment, the device key is stored on a vending interface controller (e.g., VIC 106) and the VIC encrypts the session key, credentials, and token with the device key.

At block 412, the vending machine generates and encrypts, with the device key, a transaction identification number, authorization amount, and entry type, and transmits the encrypted transaction identification number, authorization amount, entry type, as well as the encrypted session key, credentials, and account token to a central server to authorization determination. In one embodiment, the transaction identification number, authorization amount, and entry type are generated and encrypted via a VIC (e.g., VIC 106) in the vending machine.

At block 414, the data received from the vending machine is decrypted at the central server. The central server may utilize a private key and a decryption module to decrypt the data received from the vending machine. In one embodiment, the central server decrypts the transaction ID, authorization amount, and entry type with the device key. In an embodiment, the central server decrypts the session key, the credentials, and the account token with the private key.

At block 416, the decrypted data is used to produce an authorization determination as to the transaction requested by the mobile payment application. In one embodiment, the authorization determination is produced with a transaction authorization module. The authorization determination may be produced based on available funds associated with the account token, verification of credentials, and other data used and transmitted during the transaction.

At block 418, the authorization determination is transmitted to the VIC of the vending machine. In one embodiment, the authorization determination is encrypted prior to being transmitted to the vending machine with the device key. In an embodiment, the central server encrypts the session key with the device key and transmits the encrypted session key to the VIC. The VIC may decrypt the authorization information and post funds to the VMC of the vending machine if the authorization determination indicates that the transaction is authorized. The VIC may also decrypt the session key with the device key to be used for encrypted communications between the vending machine and the mobile payment device.

At block 420, the results of the transaction are transmitted to the mobile payment device. The transaction results may be encrypted by the VIC prior to transmitting the results to the mobile payment device with the session. In such embodiments, the mobile payment device is configured to decrypt the transaction results information with the session key. In one embodiment, the transaction results are displayed via a PD (e.g., PD 204) of the mobile payment device.

In the event that the user's mobile payment application account falls below a configured minimum (e.g., twenty dollars), the mobile payment application may be configured to add funds to the user's mobile payment application account. In an embodiment, the central server includes a key manager that stores an encrypted version of a credit card associated with the user of the mobile payment application. The server then decrypts the credit card data stored in the key manager and charges the credit card for the configured amount. In one embodiment, the credit card is charged via a payment processor. The user's mobile payment application account may then have the funds added for future transactions through the mobile payment application.

Figure 4:
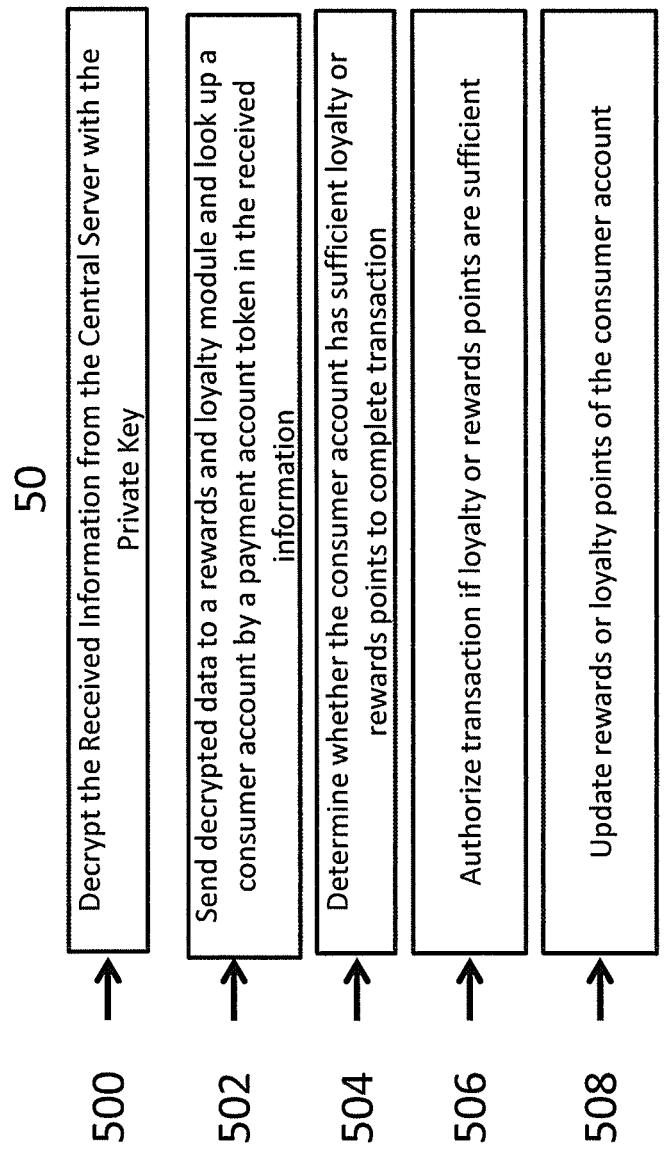
FIG. 4 is a flowchart of steps for authorizing transactions utilizing rewards or loyalty programs according to aspects of the invention.

FIG. 4 is a flowchart 50 of exemplary steps for authorizing a transaction utilizing a rewards or loyalty program in accordance with aspects of the invention. At block 500, the received information is decrypted as described at block 414 of FIG. 3.

At block 502, the decrypted data is sent to a rewards and loyalty module. The rewards and loyalty module looks up a consumer account by the payment account token in the received information from the decryption module.

At block 504, the rewards and loyalty module determines whether the consumer account has sufficient loyalty or rewards points to complete the transaction. In an embodiment, the rewards and loyalty module is configured to determine whether the consumer account has sufficient loyalty or rewards points to apply a discount to the transaction.

At block 506, the transaction is authorized if the consumer account has sufficient loyalty or rewards points. The information may be sent to a transaction settlement module to settle the transaction based on the rewards or loyalty points associated with the consumer account.

At block 508, the rewards or loyalty points associated with the consumer account is updated. For example, the transaction settlement module may send the information back to the rewards and loyalty module to either increase the amount of points or decrease the amount of points associated with the consumer account.

In an embodiment, when a transaction response is sent to the VIC, it may include information on the current reward campaign such as the transaction being free or discounted based on the amount of rewards points associated with the consumer account. The VIC may display the promotional information as a message to the consumer, e.g., via the mobile application.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for authorizing a wireless payment transaction from a mobile payment device to a vending machine wherein the vending machine comprises a vending controller (VIC1), and the mobile payment device comprises an encryption module and a mobile payment application, and the vending machine and a central server share a device key, the method comprising the steps of:

downloading, by the mobile payment device, a central server public key and account token from the central server into mobile payment application;

receiving, by the mobile payment device, user credentials;

accessing, by the mobile payment device, the mobile payment application based on the received user credentials;

generating, by the mobile payment device, a session key;

encrypting, by the encryption module, the user credentials, session key and the account token using the public key;

transmitting, by the mobile payment device, the encrypted user credentials, session key and the account token to the vending machine;

generating, by the vending machine, a transaction identification number, authorization amount, and entry type and encrypting, by the vending machine, the encrypted user credentials, session key and the account token and the transaction identification number, authorization amount and entry type using its device key;

transmitting, by the vending machine, the encrypted user credentials, session key, downloaded account token, transaction identification number, authorization amount and entry type to the central server;

decrypting, by the central server, the transaction identification number, authorization amount and entry typed using its device key;

decrypting, by the central server, the user credentials, session key, account token using a central server private key corresponding to the central server public key;

determining authorization information for the transaction, by the central server, using the account token, user credentials and amount;

encrypting, by the central server, the determined authorization information with its device key;

transmitting, by the central server, the encrypted authorization to the VIC;

decrypting, by the VIC, the received transmitted authorization information;

determining, by the VIC, that the request transaction is authorized; and based on the determination, by the VIC, that the request is authorized, posting by the VIC, funds to the vending machine.

2. The method of claim 1, wherein the decrypting step further comprises decrypting the at least one of the transaction identification number, payment authorization amount, or entry type with the device key.

3. The method of claim 1, further comprising the step of encrypting the authorization determination with the device key.

4. The method of claim 3, further comprising the step of decrypting, with the vending machine and the device key, the encrypted authorization determination.

5. The method of claim 1, further comprising the step of entering user credentials on the mobile payment device.

6. The method of claim 5, wherein the authorization determination is further based on the entered credentials.

7. The method of claim 1, further comprising the step of displaying the authorization determination on the mobile payment device.

8. The method of claim 7, wherein the authorization determination is encrypted and transmitted to the mobile payment device with the session key.

* * * * *